Figure 1:
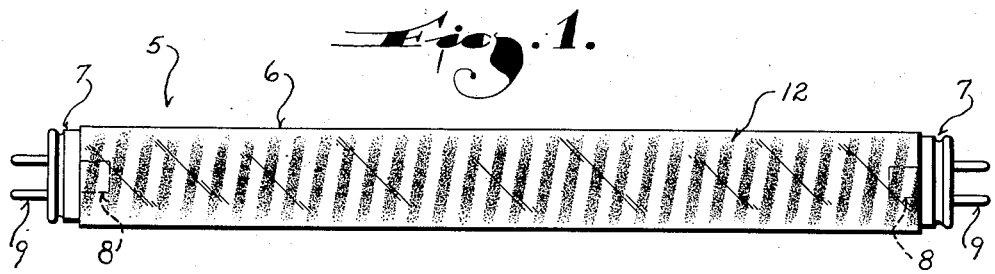

Patented Nov. 7, 1944

2,362,385

UNITED STATES PATENT OFFICE 2,362,385

GERMICIDAL LAMP

Jules L. Libby, Elgin, Ill.

Application November 13, 1942, Serial No. 465,469

1 Claim. (Cl. 176—122)

This invention relates to gaseous discharge lamps and more particularly to that form of lamp used for germicidal purposes.

Such lamps generally comprise a sealed glass envelope containing an inert gas and mercury vapor at low pressure, which atmosphere when ionized by the impression of a suitable high voltage across the electrodes of the lamp produces ultraviolet radiant energy.

Inasmuch as ordinary glass is incapable of passing ultraviolet radiations therethrough, it is necessary to provide germicidal lamps with an envelope having at least some transparency to ultraviolet radiations and especially those of between 2000 and 2950 Angstrom units which comprises the bactericidal band of the ultraviolet spectrum.

Germicidal lamps such as those described are now used extensively for the destruction of airborne bacteria wherever foodstuffs are processed and for the purification of the atmosphere in hospitals, hotels and other public buildings, for which purpose ultraviolet radiations of 2537 Angstrom units have been established as being most effective. As will be appreciated, therefore, the effectiveness of any germicidal lamp depends upon the transparency of its envelope to those radiations within the bactericidal band of the ultraviolet spectrum which measure 2537 A. U.

Germicidal lamps now in use employ an envelope of special glass known as "Corning 9720." This glass has high transparency to ultraviolet radiations above 3000 A. U. which are outside of the bactericidal band, but its transparency to radiations below 3000 A. U. which lie within the bactericidal band sharply decreases. It has been established that such glass is capable of transmitting a maximum of only about 40% of the ultraviolet radiations of 2537 A. U., which radiations, as has been stated, are most effectve for the destruction of all types of bacteria; the glass being considerably less transparent to such radiations when the wall thickness of the glass envelope exceeds 1 mm.

In one respect, however, the envelopes for germicidal lamps made of "Corning 9720" are desirable since they are opaque to ultraviolet radiations below 2000 A. U. and especially those radiations of between 1000 and 2000 A. U. which lie in the ozone forming band of the ultraviolet spectrum.

It is well known that ozone is toxis and definitely harmful to the human system reacting thereon similarly to carbon monoxide, and except when present in only minute quantities, reacts deleteriously upon foodstuffs and promotes chemical changes therein which tend to objectionably alter the flavor of the same. In addition, various metals subjected to ozone forming radiations in the destruction of air-borne bacteria oxidize rapidly, which of course is highly objectionable.

Thus by reason of the fact that "Corning 9720" does not permit passage of ozone forming radiations therethrough it is used almost exclusively in the glass envelopes of present day germicidal lamps.

Another type of special glass transparent to ultraviolet radiations, however, is now available. This latter type of glass is known to the trade as "Corning 9740," and has a higher degree of transparency to ultraviolet radiations in the bactericidal band, being capable of transmitting approximately 80% or twice the amount of the desirable radiations of 2537 A. U. than "Corning 9720." Despite this fact, "Corning 9740" has not replaced "Corning 9720" for the envelopes of germicidal lamps because of its transparency to ozone forming radiations of below 2000 A. U. This characteristic of "Corning 9740" has limited the use of germicidal lamps provided with such envelopes to food storage compartments or the like, where a small percentage of ozone is considered beneficial as an aid in the destruction of airborne bacteria.

Such small amounts of ozone as are produced by germicidal lamps having envelopes made of Corning 9740, however, preclude the use of these lamps in public buildings and hospitals or any other places frequented by human beings.

The present invention contemplates using "Corning 9740" for the glass envelope of a germicidal lamp in order to increase the effectiveness or germicidal powers of the lamps and is based on the treatment of such glass envelopes in a manner such as to minimize or largely nullify the ozone forming tendencies of ultraviolet radiations below 2000 A. U.

More particularly it is an object of this invention to provide an envelope for a gaseous discharge tube of the germicidal type which is constructed of special glass such as "Corning 9740" to increase the effectiveness of such lamps, and to partially coat portions of the envelope with a fluorescent material having the ability to absorb or largely nullify ozone forming radiations.

Another object of this invention resides in the treatment of germicidal glass envelopes made of "Corning 9740" to minimize ozone formation and thereby broaden the field of use of such lamps.

With the above and other objects in view, which will appear as the description proceeds, this invention resides in the novel method and in the novel combination and arrangement of mechanical expedients for carrying the same into effect, substantially as hereinafter described, and more particularly defined by the appended claims, it being understood that such changes in the precise embodiment of the herein-disclosed invention may be made as come within the scope of the claim.

Figure 2:
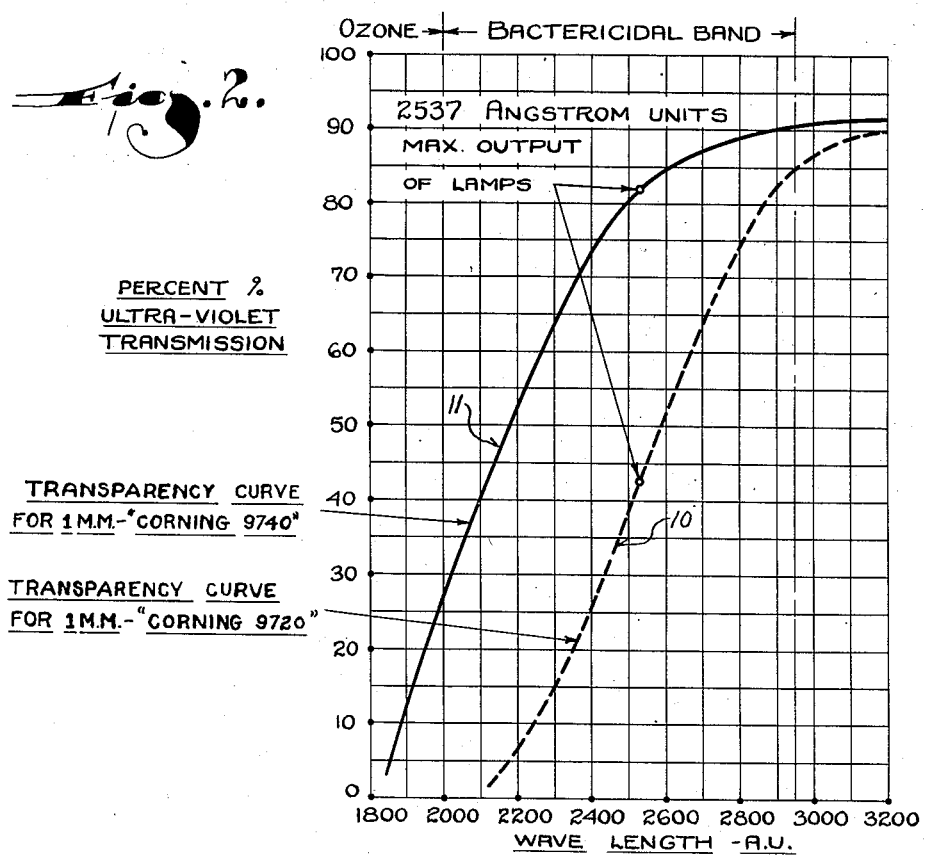

The accompanying drawing illustrates one complete example of the physical embodiment of the invention constructed in accordance with the best mode so far devised for the practical application of the principles thereof, and in which:

Figure 1 is an elevational view of a germicidal lamp equipped with the envelope of this invention; and Figure 2 is a graph comparing the transparency to ultraviolet radiations in the bactericidal band of the glass from which the envelope of this invention is made to the glass employed in envelopes of germicidal lamps hitherto in use.

Referring now more particularly to the accompanying drawing, the numeral 5 designates a gaseous discharge lamp unit having the envelope 6 of the present invention applied thereto.

Aside from the envelope 6 the gaseous discharge lamp unit 5 is of conventional construction and has a base 7 at each end of the envelope to seal the same, and electrodes or cathodes 8 projecting therefrom to the interior of the envelope and electrically connected with prongs 9 on the exterior of each base by which the lamp element is connected in circuit for the impression of a suitable high voltage charge across its electrodes or cathodes 8.

As is customary, the interior of the envelope is filled with inert gas and a quantity of mercury vapor at low pressure so as to provide a source of ultraviolet radiations upon ionization of the gaseous atmosphere of the tube.

The envelope 6, in order to pass ultraviolet radiations therethrough for germicidal purposes, must be of special glass as ordinary glass is opaque to such radiations. The envelopes of most germicidal lamps in present day use are made of a glass known as "Corning 9720," which, however, is transparent to but a small percentage of the radiations constituting the bactericidal band of the ultraviolet spectrum.

The per cent of transparency to ultraviolet radiations in the bactericidal band of such glass is shown in Figure 2 where its degree of transparency is represented by the dotted line curve 10.

The graph illustrates that the transparency of "Corning 9720" to ultraviolet radiations in the bactericidal band decreases sharply from relatively high transparency to the longer radiations (2950 A. U.), to opacity to radiations of approximately 2100 A. U. Only about 42½% of the most effective radiations having wave lengths of 2537 A. U. are capable of transmission by "Corning 9720."

The glass envelope 6 of the present invention, however, is made of special glass known as "Corning 9740" or a glass similar thereto and which has improved transparency to ultraviolet radiations in the bactericidal band and particularly to those radiations the wave lengths of which measure 2537 A. U., and which are most effective for germicidal purposes.

The solid line curve 11 of the graph illustrates the different percentages of transparencies of "Corning 9740" to the ultraviolet radiations generated in the bactericidal band. The glass envelope 6 of this invention is transparent to more than 90% of the radiations at the upper extreme of the bactericidal band having wave lengths of 2950 A. U., and the transparency of the glass decreases gradually toward the lower extremity of the bactericidal band until it reaches the point of intersection with the 2537 A. U. line (not shown) from whence the transparency decreases sharply and the glass becomes opaque to radiations having wave lengths of approximately 1800 A. U.

Attention is directed to the fact, however, that the transparency of "Corning 9740" glass to ultraviolet radiations having wave lengths of 2537 A. U. is substantially twice as great as that of "Corning 9720" which has heretofore been used in germicidal lamps. The transparency curve for "9740" crosses the 2537 line at approximately the 82% transparency level which means that the glass envelope for the germicidal lamp of this invention is transparent to more than 80% of the most effective radiations generated by the lamp, those of 2537 A. U. wave length.

The lower extreme of the curve 11, however, projects into the ozone forming band of radiations as clearly illustrated by the graph, and which band comprises radiations having wave lengths varying between 1000 and 2000 A. U. Such radiations have the ability to break down oxygen in the air and to form ozone. This characteristic of "Corning 9740" is responsible for its limited use in envelopes for germicidal lamps, since ozone is definitely harmful to the human system, reacting on human being in much the same manner as carbon monoxide.

Consequently "Corning 9740" could not be used for the envelope of a germicidal lamp in a hotel or hospital installation or in any other place frequented by human being. Heretofore, the only use possible with "Corning 9740" equipped germicidal lamps was in the food industry where meat storage enclosures were sometimes provided with such lamps.

In such an installation, human being are not likely to be subjected to the toxic effects of ozone and small amounts of ozone when circulated throughout a storage enclosure, are considered helpful in destroying such air-born bacteria as are not directly under the influence of the germicidal lamps. Obviously, some food products suffer from even small percentages of ozone developed by germicidal lamps, and in such cases, the less effective "Corning 9720" envelopes must be used.

The present invention, however, broadens the field of use of germicidal lamps having envelopes made of special glass such as "Corning 9740" by treatment of the envelope in a manner to largely nullify the ozone forming tendency of the radiations generated by the lamp of between 1800 and 2000 A. U. This is effected by means of a partial coating 12 of fluorescent material on the envelope which is preferably applied to the envelope on its interior in the form of a spiral band. The convolutions of this spiral are pitched so as to leave clear glass portions between the coated areas of a width such that from 33⅓% to 40% clear glass space remains on the envelope. It will be appreciated however that any other arrangement which would provide alternately coated and uncoated portions on the envelope would serve the same purpose.

The coating of fluorescent material 12 to a large extent nullifies the ozone forming tendency of the radiations with wave lengths below 2000 A. U. The manner in which the fluorescent material acts to accomplish this purpose has not definitely been established, but tests have shown that when compared to an uncoated envelope of "Corning 9740" having equal clear glass area, considerably less ozone is formed; and that the amount of ozone which is produced is so slight as to be entirely non-injurious to human beings.

The apparent power of the partial fluorescent coating to absorb ozone therefore enables the safe use of "Corning 9740" for the glass envelopes of germicidal lamps either in the food industry or in public places frequented by human beings, and as stated hereinbefore, the use of such glass substantially doubles the germicidal efficiency of the lamp.

Aside from its function of absorbing ozone forming radiations the fluorescent material 12 on the envelope provides an efficient source of light for illuminating purposes which is of sufficient intensity as to obviate the necessity for separate lighting fixtures when germicidal lamps are used.

In this respect the envelope of this invention is similar to that forming the subject matter of the copending application of Jules L. Libby, Serial No. 436,752, filed March 30, 1942, and entitled "Combination illuminating and germicidal lamp and method of making the same." By reason of this common subject matter the present invention forms a continuation of the aforementioned copending application.

Although Figure 1 illustrates a tubular form of germicidal lamp element, it will be appreciated that the envelope may be blown in the form of bulbs such as are used in conventional incandescent filament lamps.

From the foregoing description taken in connection with the accompanying drawing it will be readily apparent to those skilled in the art that this invention provides a germicidal lamp of maximum effectiveness by reason of the high transparency of its envelope to ultraviolet radiations of 2537 A. U. wave length. It is to be understood that in the claims, the use of the words "transparent" or "transparency" in defining the characteristics of the glass envelope does not necessarily mean that the glass is wholly transparent to ultraviolet radiations or that the glass passes all radiations of any certain wave length therethrough.

What I claim as my invention is:

In a combination germicidal and illuminating lamp of the type which generates ultraviolet radiations, an envelope for the lamp comprising: a glass tube of special glass transparent to ultraviolet radiations having wave lengths above 1800 A. U., said envelope being capable of transmitting in excess of 80% of the 2537 A. U. radiations generated at the source; and a fluorescent surface coating on a sufficient area of said envelope to leave approximately 33⅓% to 40% clear glass area, for largely nullifying the ozone forming tendency of the radiations from the source having wave lengths below 2000 A. U., said fluorescent surface coating permitting transmission of ultraviolet radiations by the tube of between 2000 and 2900 A. U. and through excitation by the 2537 A. U. radiations thereof producing visible radiations for illuminating purposes.

JULES L. LIBBY.